(12) United States Patent
Lee

(10) Patent No.: US 10,308,093 B2
(45) Date of Patent: Jun. 4, 2019

(54) LOAD DISTRIBUTION APPARATUS OF MAGNETIC WHEEL

(71) Applicant: TAS GLOBAL CO., LTD., Busan (KR)

(72) Inventor: Dong Wook Lee, Seoul (KR)

(73) Assignee: TAS GLOBAL CO., LTD., Seoul (KR)

( * ) Notice: Subject to any disclaimer, the term of this patent is extended or adjusted under 35 U.S.C. 154(b) by 0 days.

(21) Appl. No.: 15/524,582

(22) PCT Filed: Oct. 29, 2015

(86) PCT No.: PCT/KR2015/011527
§ 371 (c)(1),
(2) Date: May 4, 2017

(87) PCT Pub. No.: WO2016/076555
PCT Pub. Date: May 19, 2016

(65) Prior Publication Data
US 2018/0281552 A1 Oct. 4, 2018

(30) Foreign Application Priority Data
Nov. 10, 2014 (KR) .......................... 10-2014-0155253

(51) Int. Cl.
*B25J 5/00* (2006.01)
*B60G 3/01* (2006.01)
(Continued)

(52) U.S. Cl.
CPC .............. *B60G 21/067* (2013.01); *B25J 5/00* (2013.01); *B60B 19/00* (2013.01); *B60B 19/006* (2013.01);
(Continued)

(58) Field of Classification Search
CPC ........ B60G 21/067; B60G 15/12; B60G 3/01; B60G 2204/45; B60G 2204/4502;
(Continued)

(56) References Cited

U.S. PATENT DOCUMENTS

| | | | | | |
|---|---|---|---|---|---|
| 1,835,112 | A | * | 12/1931 | Hawkins | .................. B60G 5/01 180/14.1 |
| 3,906,572 | A | * | 9/1975 | Winn | .................. A47L 11/4011 114/222 |
| 3,958,652 | A | * | 5/1976 | Urakami | ................. B63B 59/10 180/7.1 |
| 3,970,327 | A | * | 7/1976 | Dezelan | ............... B60G 21/067 280/683 |

(Continued)

FOREIGN PATENT DOCUMENTS

EP 0288449 A1 * 10/1988 ............. B63B 59/10
JP 2006027522 A * 2/2006
(Continued)

*Primary Examiner* — Laura Freedman
(74) *Attorney, Agent, or Firm* — Heedong Chae; Lucem, PC

(57) ABSTRACT

A load distribution apparatus of magnetic wheel, includes: a plurality of cylinder parts including one sides respectively connected to a plurality of magnetic wheels and an upper space portion and a lower space portion whose interiors do not communicate to each other; and a passage part which serves as a moving path of fluid and interconnects the plurality of cylinder parts. The passage part is configured to evenly distribute a load applied to the magnetic wheels by moving fluids in the upper space portion and the lower space portion in such a manner that the fluids are not mixed.

4 Claims, 7 Drawing Sheets

(51) Int. Cl.
*F16F 9/32* (2006.01)
*F16F 9/58* (2006.01)
*B60B 19/00* (2006.01)
*B60G 15/12* (2006.01)
*B60G 21/06* (2006.01)
*B63B 59/06* (2006.01)
*B60G 21/067* (2006.01)

(52) U.S. Cl.
CPC ............... *B60G 3/01* (2013.01); *B60G 15/12* (2013.01); *B60G 21/06* (2013.01); *B63B 59/06* (2013.01); *F16F 9/3214* (2013.01); *F16F 9/3221* (2013.01); *F16F 9/585* (2013.01); *B60G 2300/00* (2013.01); *B60G 2400/61* (2013.01); *B63B 2059/065* (2013.01)

(58) Field of Classification Search
CPC ........................ B60G 2300/00; B60G 2400/61; B60G 21/06; B63B 59/06; B63B 59/08; B63B 59/10; B63B 2059/065; B60B 19/006; B60B 19/00; F16F 9/58; F16F 9/585; F16F 9/3221; F16F 9/3214; B25J 5/00
See application file for complete search history.

(56) References Cited

U.S. PATENT DOCUMENTS

| | | | | | |
|---|---|---|---|---|---|
| 4,029,164 | A | * | 6/1977 | Urakami | B62D 37/00 114/222 |
| 4,095,378 | A | * | 6/1978 | Urakami | B24C 3/062 114/222 |
| 4,420,167 | A | * | 12/1983 | Winblad | B60G 17/033 172/401 |
| 6,000,484 | A | * | 12/1999 | Zoretich | B05B 13/005 180/21 |
| 2006/0162610 | A1 | * | 7/2006 | Reboredo Losada | B60B 3/048 104/138.1 |
| 2017/0253285 | A1 | * | 9/2017 | Lee | B63B 59/06 |
| 2017/0355225 | A1 | * | 12/2017 | Lee | B63B 59/08 |

FOREIGN PATENT DOCUMENTS

| | | | |
|---|---|---|---|
| JP | 2007021643 A | * | 2/2007 |
| KR | 1020040034159 A | * | 4/2004 |
| KR | 100811540 B1 | * | 3/2008 |
| KR | 101075578 B1 | * | 10/2011 |

* cited by examiner (a)

(b)

(a)

(b)

LOAD DISTRIBUTION APPARATUS OF MAGNETIC WHEEL

CROSS-REFERENCE TO RELATED APPLICATION

This application claims the benefit of Korean application No. 10-2014-0155253, filed on Nov. 10, 2014 with the Korean Intellectual Property Office, the disclosure of which is incorporated herein by reference.

TECHNICAL FIELD

The present invention relates to a load distribution apparatus of magnetic wheel and more particularly, to a load distribution apparatus of magnetic wheel, which is capable of evenly distributing a load applied to a plurality of magnetic wheels, thereby allowing the maximal utilization of individual adsorptive forces of the magnetic wheels.

BACKGROUND ART

In general, aquatic creatures living under water, such as barnacles, sea squirts, serpula, mytilus galloprovincialis, freshwater shellfish, lagoon bugyul body, visible bluish, greener and so on, adhere to and live in a surface of the body of a ship, which does various damage to the ship.

For example, aquatic creatures adhered to the ship body may increase frictional resistance to seawater, thereby decreasing a sailing speed of the ship and increasing fuel consumption, which is at an economic disadvantage.

Conventionally, a cleaning work by a worker of moving a ship to be cleaned to a land dock and stripping off attachments of the wall of the ship by jetting water with a high pressure hose has been generally used. Since this method requires a preparation procedure to move the ship to the dock, there is a disadvantage that long cleaning time is taken and many workers are mobilized.

A diver may clean the bottom of the ship under water, without moving the ship. However, even for a diver skilled at underwater work environments, it takes a long time to clean a wide range of ship body and the level of difficulty in the cleaning work increases due to poor visibility.

In order to avoid the problem that cleaning the bottom of the ship by a worker is difficult to remove attachments efficiently and requires many workers, there has been proposed a method of applying paints mixed with toxic material in order to prevent marine creatures from adhering and parasitizing in the surface of a ship.

However, the proposed method causes other problems of seawater pollution and detrimental effects on other marine creatures to destroy the aquatic ecosystems and is therefore forbidden by international organizations. In addition, when the toxicity decreases after lapse of certain time, paints should be again applied after cleaning.

In order to overcome such a problem, there has been proposed a technique that a cleaning robot removes deposits while moving along the wall of a ship under water.

"An underwater robot for cleaning and inspection of the bottom of a ship" disclosed in KR Patent Registration No. 10-0811540 is a propulsive apparatus which moves along the wall of a ship body and cleans the wall using a brush fixed at the underwater robot.

However, this method causes upsizing of cleaning equipment due to a propeller, which results in difficulty in efficient cleaning of the ship bottom having a large curvature, and requires many sensors used to stably move the robot along the wall of the ship body, which results in high costs.

In order to clean the bottom of a ship, it is important to closely attach a cleaning apparatus to the ship bottom. To this end, there has been proposed a method of using a magnetic wheel.

Some cleaning apparatuses using magnetic wheels have no consideration of uniformity of an attachment target surface including the ship bottom.

In this case, if the attachment target surface to which one of the magnetic wheels is attached is lower than the ground, the corresponding magnetic wheel may be detached from the attachment target surface and, accordingly, the overall force with which a cleaning apparatus is attached to the attachment target surface is weakened.

If attachment target surfaces of diagonally arranged magnetic wheels are lower than other attachment target surfaces, the diagonally arranged magnetic wheels are simultaneously separated from the attachment target surfaces. Therefore, since a load is weighted on magnetic wheels diagonally arranged in a different direction or three of four magnetic wheels contact the attachment target surfaces simultaneously and are obliquely attached to the attachment target surfaces, a magnetic force of the magnetic wheels cannot be properly delivered.

In actuality, since the bottoms of most ferromagnetic bodies as attachment target surfaces are not flat, there is a disadvantage in that a design should be made in preparation for non-attachment of magnetic wheels to attachment target surfaces. In addition, more than four magnetic wheels are difficult to be mounted due to characteristics of the magnetic wheels that an adsorptive force is rapidly decreased if the magnetic wheels are separated from the attachment target surfaces.

On the other hand, when magnetic wheels are attached to floors, walls, ceilings and so on formed of a ferromagnetic body, an external force exerts to separate the magnetic wheels rather than to press the magnetic wheels.

Even if the volume of a magnet is increased twice, a magnetic force is increased less than twice. Therefore, the size of the magnet cannot be blindly increased. Therefore, in order to increase the adsorptive force of the magnetic wheels, it is more effective to use a number of magnetic wheels.

In this case, providing springs in individual magnetic wheels may be considered. For example, in a case of using tension springs, when the forefront magnetic wheel of a plurality of magnetic wheels is applied with a force and is attracted, there differs in forces applied to magnetic wheels arranged in the rear side depending on an elongation percentage of the tension springs. That is, the magnetic wheel located in the forefront shares the largest force and the magnetic wheel located in the rearmost shares the smallest. This is inefficient because the respective magnetic wheels do not evenly share an adsorptive force against an external force.

The above description is only provided as a background to assist in understandings of the present invention but is not intended to elucidate the technique known in the art to which the present invention belongs.

RELATED TECHNICAL DOCUMENT

Patent Document (Patent Document 1) KR Patent Registration No. 10-0811540 (owned by Daewoo Shipbuilding Marine Engineering Co. Ltd., and issued at Jul. 3, 2008)

DISCLOSURE

Technical Problem

Accordingly, it is an object of the present invention to provide a load distribution apparatus of magnetic wheel, which is capable of evenly distributing a load applied to a plurality of magnetic wheels, thereby allowing the maximal utilization of individual adsorptive forces of the magnetic wheels.

Technical Solution

According to an aspect of the present invention, there is provided a load distribution apparatus of magnetic wheel, comprising: a plurality of cylinder parts including one sides respectively connected to a plurality of magnetic wheels and an upper space portion and a lower space portion whose interiors do not communicate to each other; and a passage part which serves as a moving path of fluid and interconnects the plurality of cylinder parts, wherein the passage part is configured to evenly distribute a load applied to the magnetic wheels by moving fluids in the upper space portion and the lower space portion in such a manner that the fluids are not mixed.

Preferably, each of the plurality of cylinder parts includes a cylinder body partitioned into the upper space portion and the lower space portion by a piston elevatably provided in the cylinder body; and a piston rod including one side connected to the piston and the other side connected to the magnetic wheel.

Preferably, a stopper to limit the descent height of the cylinder body is provided in the cylinder body or the piston rod.

Preferably, the stopper is provided in the cylinder body or the piston rod located in the forefront and in the cylinder body or the piston rod located in the rearmost.

Preferably, the cylinder bodies have the same inner diameter.

Preferably, the passage part includes a first passage interconnecting the upper space portions of the cylinder parts to communicate to each other; and a second passage interconnecting the lower space portions of the cylinder parts to communicate to each other.

Preferably, the load distribution apparatus is used for cleaning of the bottom of a ship.

Advantageous Effects

According to the embodiments of the present inventions, since a load applied to the respective magnetic wheels can be evenly distributed by the plurality of cylinder parts and the passage part interconnecting the plurality of cylinder parts, it is possible to provide the maximal utilization of individual adsorptive forces of the magnetic wheels.

MODE FOR INVENTION

Figure 1:
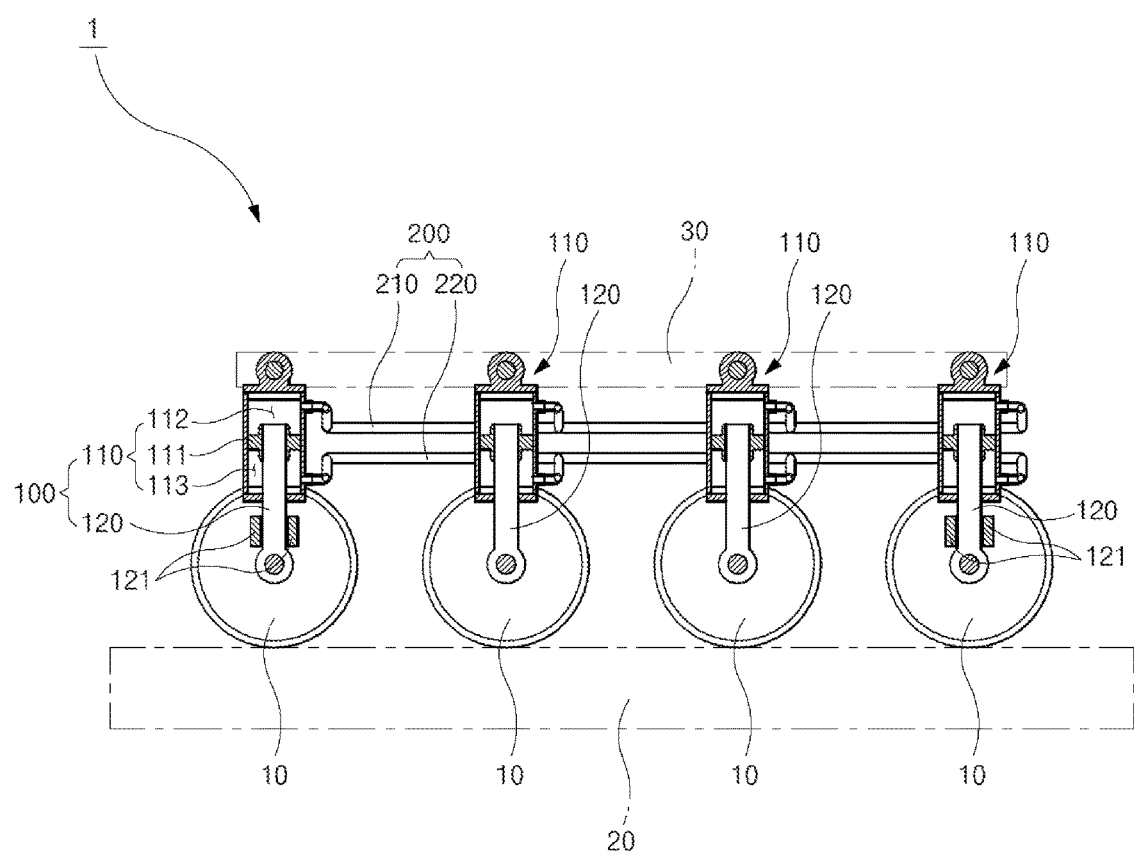
FIG. 1 is a schematic view showing a load distribution apparatus of magnetic wheel according to one embodiment of the present invention.

In order to fully understand the present invention, advantages of operation of the present invention, and purposes achieved by embodiments of the present invention, the accompanying drawings illustrating preferred embodiments of the present invention and contents described in the accompanying drawings should be referenced.

Hereinafter, preferred embodiments of the present invention will be described with reference to the accompanying drawings. Throughout the drawings, the same elements are denoted by the same reference numerals.

Figure 2:
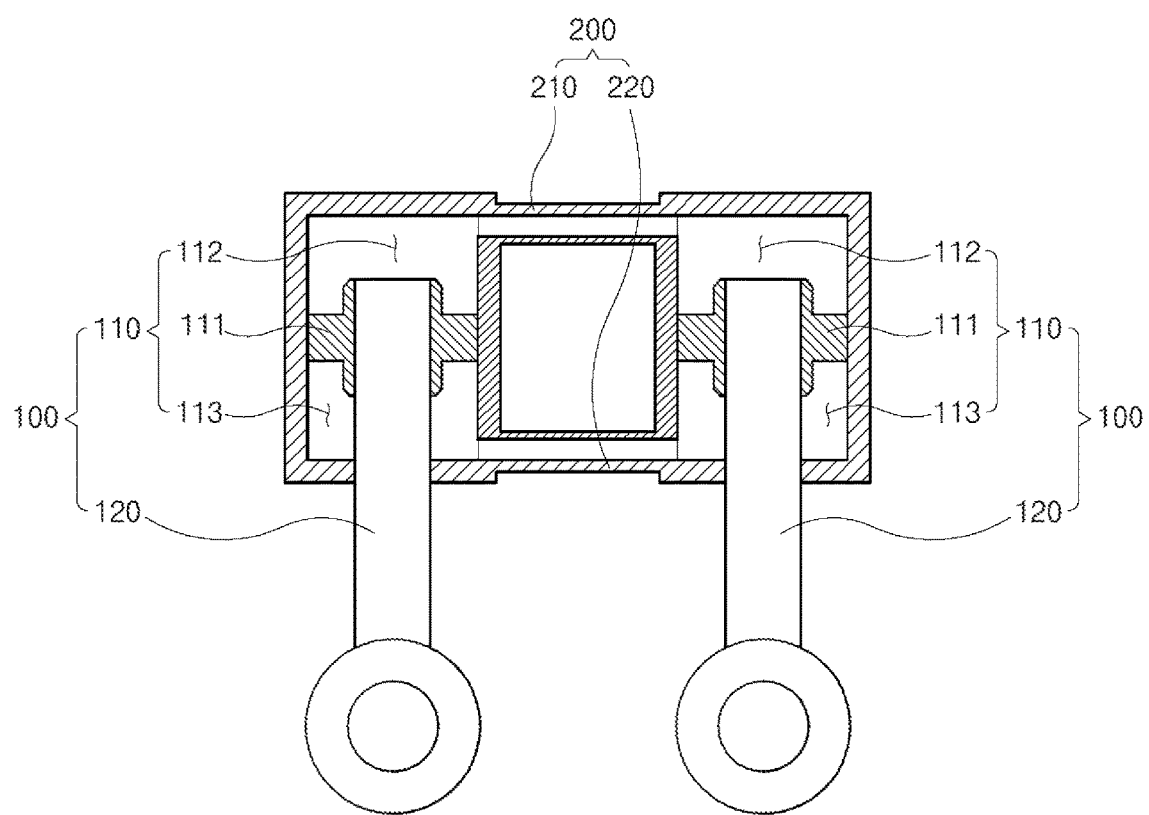
FIG. 2 is an enlarged view of a main part shown in FIG. 1.
Figure 3:
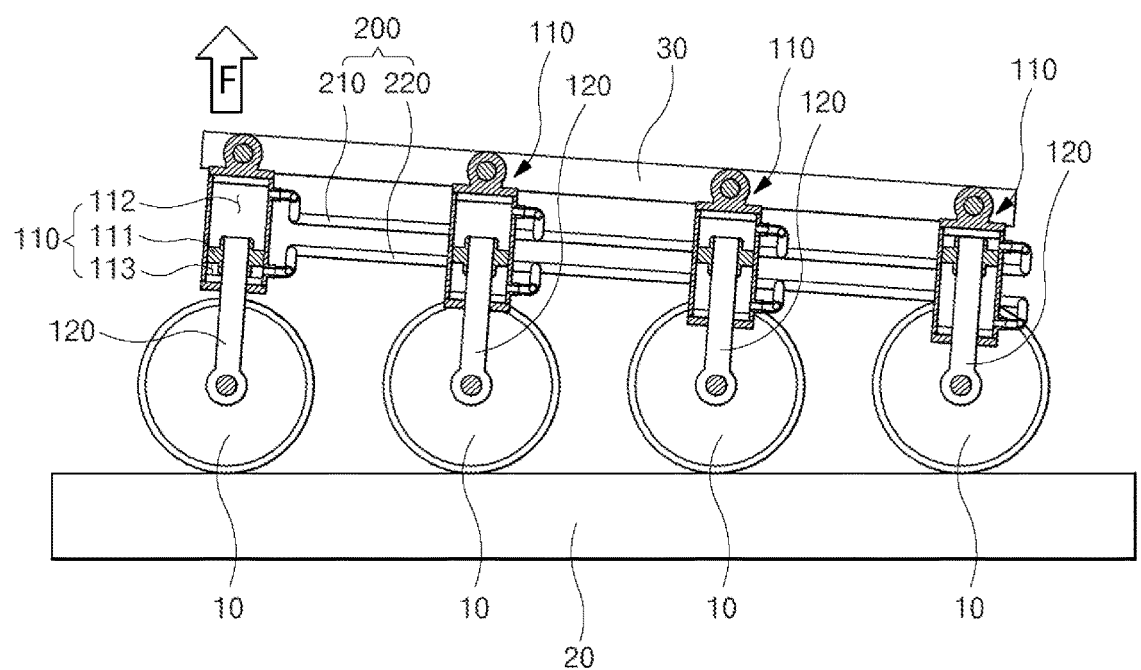
FIG. 3 is a view for explaining a problem which may be caused when no stopper is provided in a piston rod shown in FIG. 1.

FIG. 1 is a schematic view showing a load distribution apparatus of magnetic wheel according to one embodiment of the present invention. FIG. 2 is an enlarged view of a main part shown in FIG. 1. FIG. 3 is a view for explaining a problem which may be caused when no stopper is provided in a piston rod shown in FIG. 1.

As shown in these figures, a load distribution apparatus 1 for magnetic wheels according to this embodiment includes a plurality of cylinder parts 100 including one sides respectively connected to a plurality of magnetic wheels and an upper space portion 112 and a lower space portion 113 whose interiors do not communicate to each other, and a passage part 200 which serves as a moving path of fluid and interconnects the plurality of cylinder parts 100.

As shown in FIG. 1, the cylinder parts 100 may be provided to correspond to the magnetic wheels 10 and play a role to evenly distribute a load applied to the magnetic wheels 10 when a fluid accommodated in one cylinder part 100 is moved to another cylinder part 100 via the passage part 200.

In this embodiment, as shown in FIGS. 1 and 2, each of the cylinder parts 100 includes a cylinder body 110 partitioned into an upper space portion 112 and a lower space portion 113 by a piston 111 elevatably provided therein, and a piston rod 120 including an upper side connected to the piston 111 and a lower side connected to a magnetic wheel 10.

As shown in FIG. 1, an upper end of the cylinder body 110 of the cylinder part 100 can be removably coupled to a frame of a cleaning apparatus.

In addition, as shown in FIGS. 1 and 2, the cylinder body 110 is partitioned into the upper space portion 112 and the lower space portion 113 by the piston 111 provided in the central portion and a fluid filled in the upper space portion 112 and a fluid filled in the lower space portion 113 are short-circuited to each other by the piston 111.

Accordingly, the fluid filled in the upper space portion 112 is moved to only the upper space portion 112 according to motion of the piston 111 and the fluid filled in the lower space portion 113 is moved to only the lower space portion 113. As a result, this embodiment includes two closed fluid circuits, i.e., one being an upper space portion closed circuit of the fluid flowing in the upper space portion 112 and the other being a lower space portion closed circuit of the fluid flowing in the lower space portion 113.

In this embodiment, the cylinder bodies 110 may have the same inner diameter. For example, the left cylinder body 110 and the right cylinder body 110 shown in FIG. 2 may the same inner diameter of 30 mm.

The diameter of the left and right piston rods 120 may be 20 mm.

Therefore, the area of the piston 111 in contact with the upper space portion 112 is 7.0 cm² and the area of the piston 111 in contact with the lower space portion 113 is 3.9 cm². That is, in this embodiment, the area of the piston 111 in contact with the upper space portion 112 may be different from the area of the piston 111 in contact with the lower space portion 113. If the left piston 111 is ascended by 1 cm, the fluid accommodated in the left upper space portion 112 is pushed by 7.0 cm³ into the right upper space portion 112.

The fluid in the left upper space portion 112 is moved by 7.0 cm³ into the right upper space portion 112 via a first passage 210 and descends the piston 111 in the right cylinder body 110. Since the pistons 111 in contact with the left and right upper space portions 112 have the same area, the descent distance of the piston 111 in the right cylinder body 110 is 1 cm.

As a result, the right lower space portion 113 is descended by 1 cm and the fluid in the right lower space portion 113 is moved by 3.3 cm³ into the left lower space portion 113 via a second passage 220. Since the pistons 111 in contact with the left and right lower space portions 113 have the same area, the ascent distance of the piston 111 in the left lower space portion 113 is 1 cm.

The lower side of the piston rod 120 of the cylinder part 100 can be removably fitted into a shaft of the magnetic wheel 10 and the upper side thereof can be removably fitted into or welded to the piston 111.

In this embodiment, a stopper 121 is provided in each of the forefront and rearmost piston rods 120, as shown in FIG. 1. The stopper 121 serves to maintain the lower space portion 113 of the cylinder body 110 at a specified pressure, distribute an external force F, and prevent the apparatus from being excessively tilted.

More specifically, as shown in FIG. 3, when the forefront piston 111 is in direct contact with the lower space portion 113 of the cylinder body 110, no pressure is generated in the lower space portion 113 and, accordingly, no pressure can be delivered to other cylinder bodies 110.

In addition, the external force F is concentrated on the leftmost magnetic wheel 10 through the piston in direct contact with the lower space portion 113 and, accordingly, cannot be evenly distributed over the entire magnetic wheels 10.

In this case, furthermore, as shown in FIG. 3, the apparatus may be excessively tilted.

The passage part 200 serves to interconnect the cylinders and flow the fluid in the cylinders while forming a closed circuit.

In this embodiment, as shown in FIG. 1, the passage part 200 includes a first passage 210 for interconnecting the upper space portions 112 of the cylinder bodies 110 to form a closed circuit and a second passage 220 for interconnecting the lower space portions 113 of the cylinder bodies 110 to form a closed circuit.

Accordingly, in this embodiment, the fluid (e.g., oil or compressed gas) stored in the upper space portion 112 is moved into only other upper space portions 112 via the first passage 210 but is not moved into the lower space portions 113. This is equally applied to the lower space portions 113.

Figure 4:
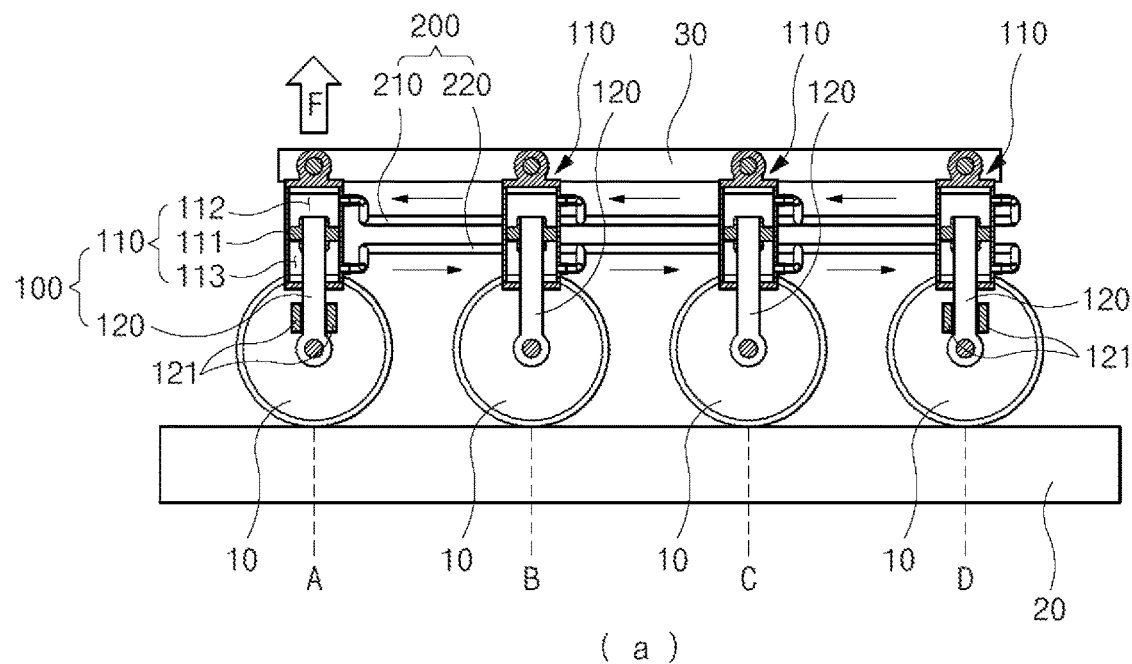
FIGS. 4 to 6 are view for explaining the operation of the apparatus according to this embodiment.
Figure 4:
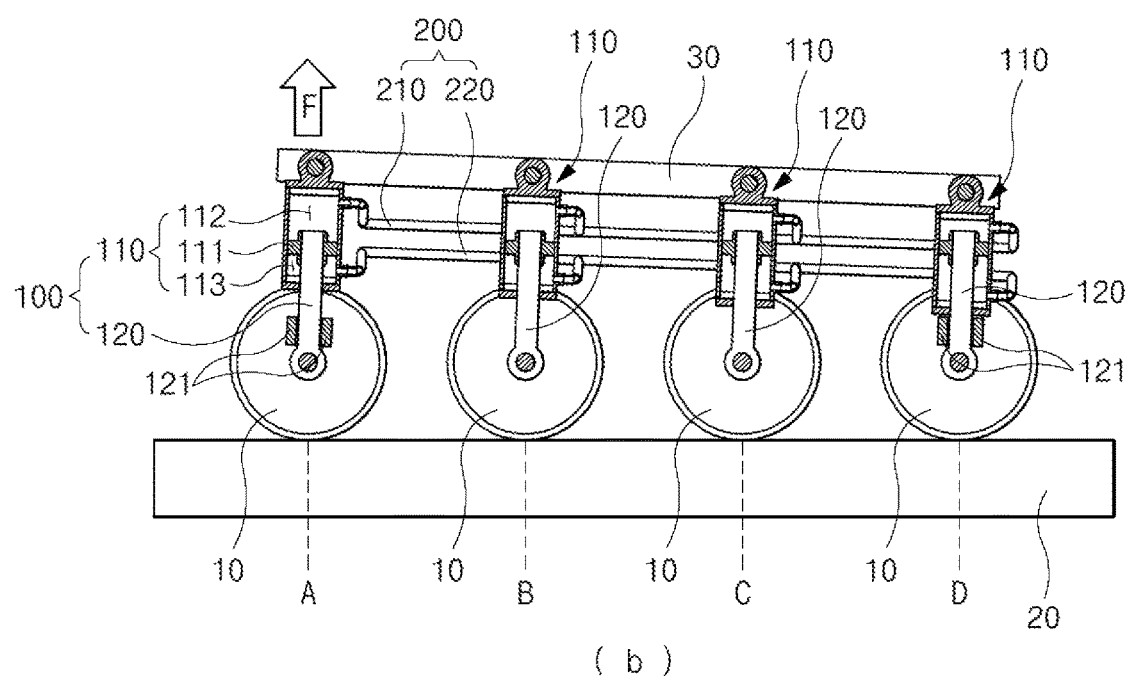
Figure 5:
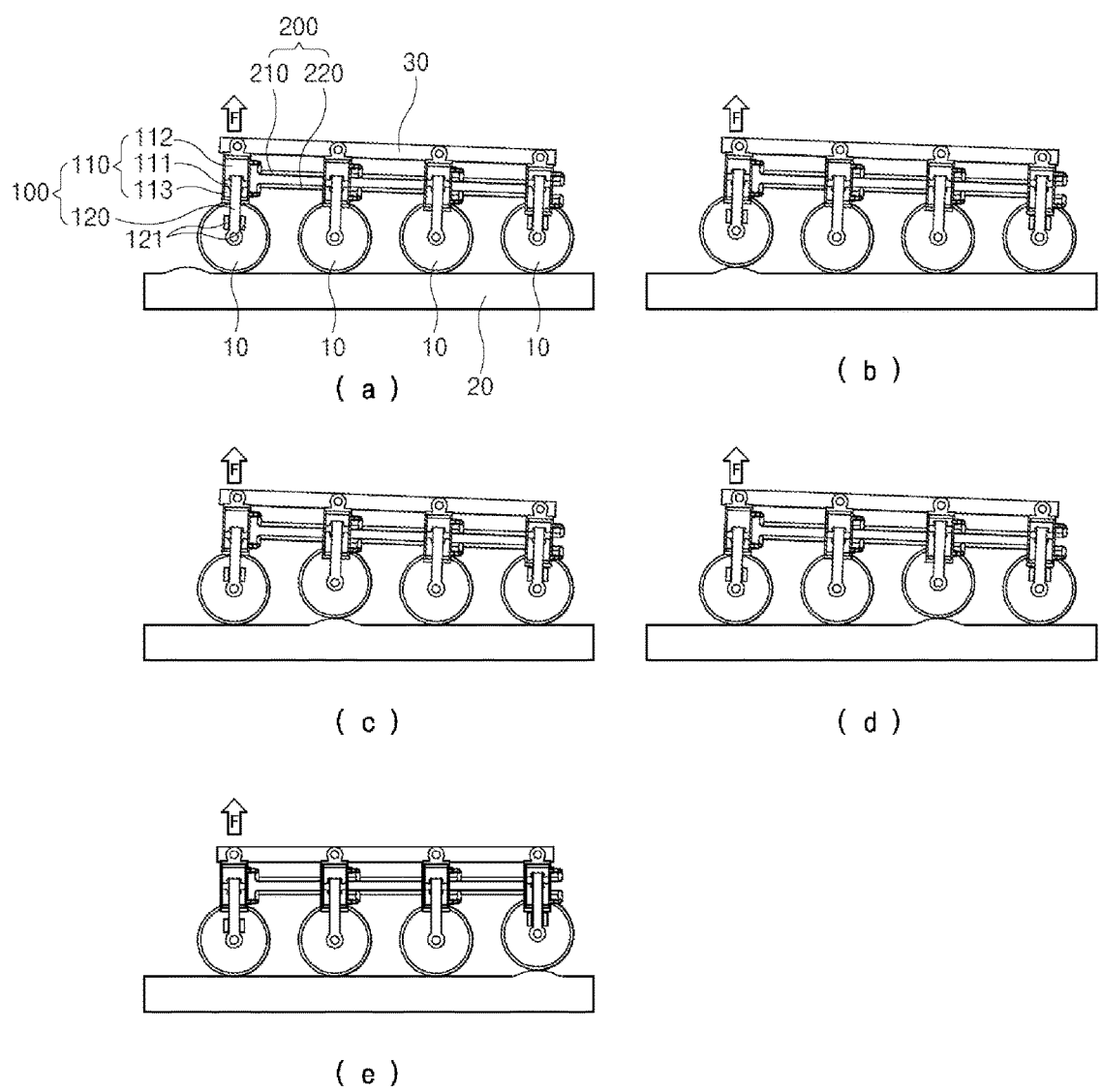
Figure 6:
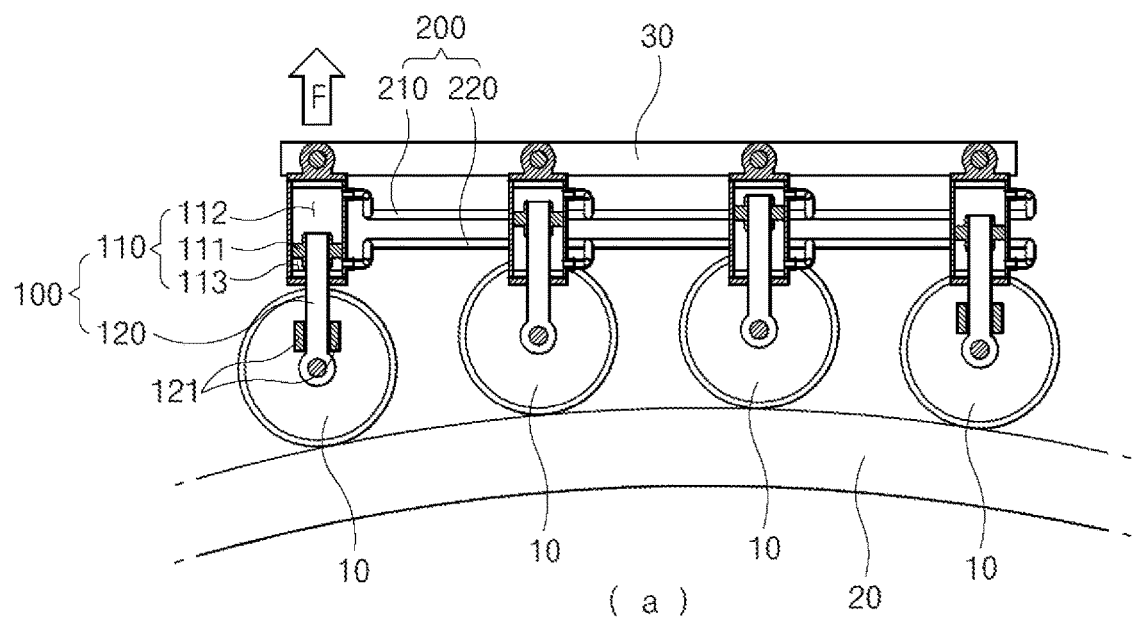
Figure 6:
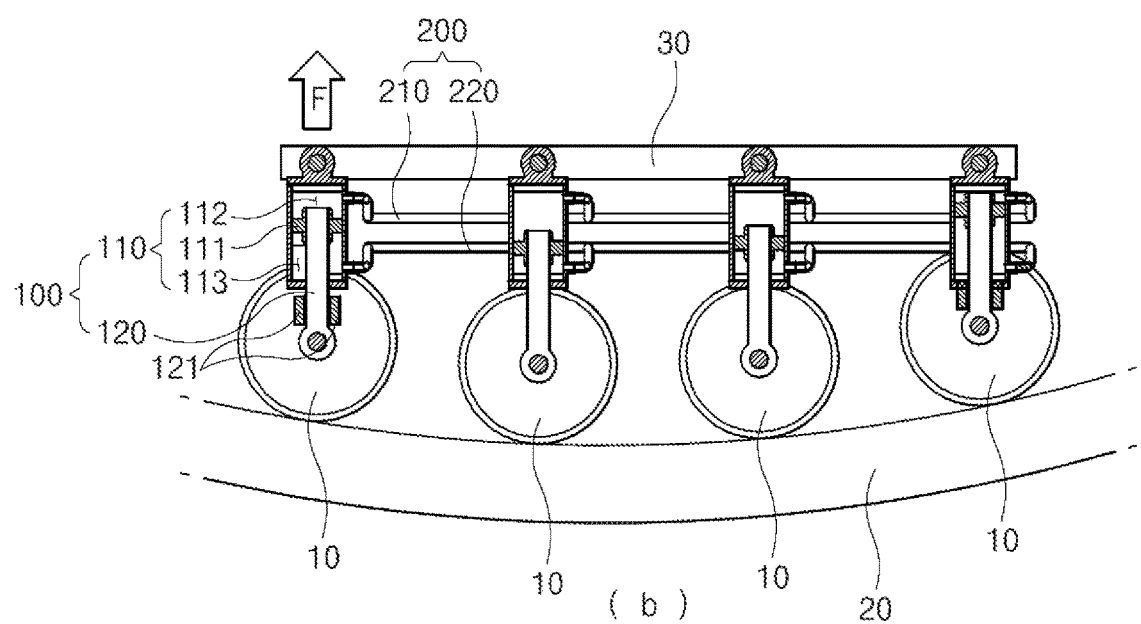

FIGS. 4 to 6 are view for explaining the operation of the apparatus according to this embodiment.

Hereinafter, the operation of the apparatus according to this embodiment will be described in brief with reference to FIGS. 4 to 6.

First, as shown in FIG. 4, when the force F is exerted at a position A of the magnetic wheel 10, the piston 111 at the position A tries to move to the lower space portion 113 of the cylinder body 110 and, accordingly, a pressure is produced in the corresponding lower space portion 113.

The pressure produced in the lower space portion 113 at the position A is equally applied to the lower space portions 113 at positions B, C and D according to the Pascal's principle. At this time, a force applied to each magnetic wheel 10 is obtained according to the formula 'Force=Pressure×Area.' Since the pistons 111 have the same area and pressure, the force applied to the respective magnetic wheels 10 is evenly distributed.

In the above example, the reason for application of the force F is as follows. In most cases, the apparatus using the magnetic wheels 10 is climbed on or attached to a wall of a ferromagnetic body as an attachment object 20, with heavy components and power/communication cables equipped in the apparatus. All components equipped in the apparatus are affected by an external force such as gravity which tries to separate the apparatus from the attachment object 20. Therefore, the description is given with the presumption that the force F is applied to the apparatus.

When the pulling force lasts, as shown in FIG. 4A, a force to push out the internal fluid of the cylinder body 110 exerts on the lower space portion 113 at the position A and a force to suck in the internal fluid of the cylinder body 110 exerts on the upper space portion 112 at the position A.

Since the total sum of volumes of internal fluids of the respective cylinder bodies 110 is unchanged, the sum of fluids of the upper space portions 112 and the sum of fluids of the lower space portions 113 at the positions A, B, C and D are unchanged.

Accordingly, as shown in FIG. 4B, the respective fluids in the cylinder bodies 110 are flown until the cylinder body 110 at the position D contacts the stopper 121.

FIG. 5 shows a situation where the apparatus of this embodiment encounters and crosses a protruding bump existing on the attachment object 20, with a force applied in the direction F.

In the example shown in FIG. 5, the diameter of each of the magnetic wheels 10 is 200 mm and the height of the protruding bump is 20 mm, and a stroke of each of the pistons 111 is 100 mm.

In this embodiment, the stroke of the piston 111 may be increased to cross a larger protruding bump.

FIG. 6 shows a situation where the apparatus moves over a large curved surface with a force applied in the direction F.

As indicated by the position D in FIG. 6, the height of the stopper 121 may be changed according to situations.

In the example shown in FIG. 6, the diameter of each of the magnetic wheels 10 is 200 mm, the stroke of each of the pistons 111 is 100 mm, and the radius of the attachment object 20 is 2.5 m.

Figure 7:
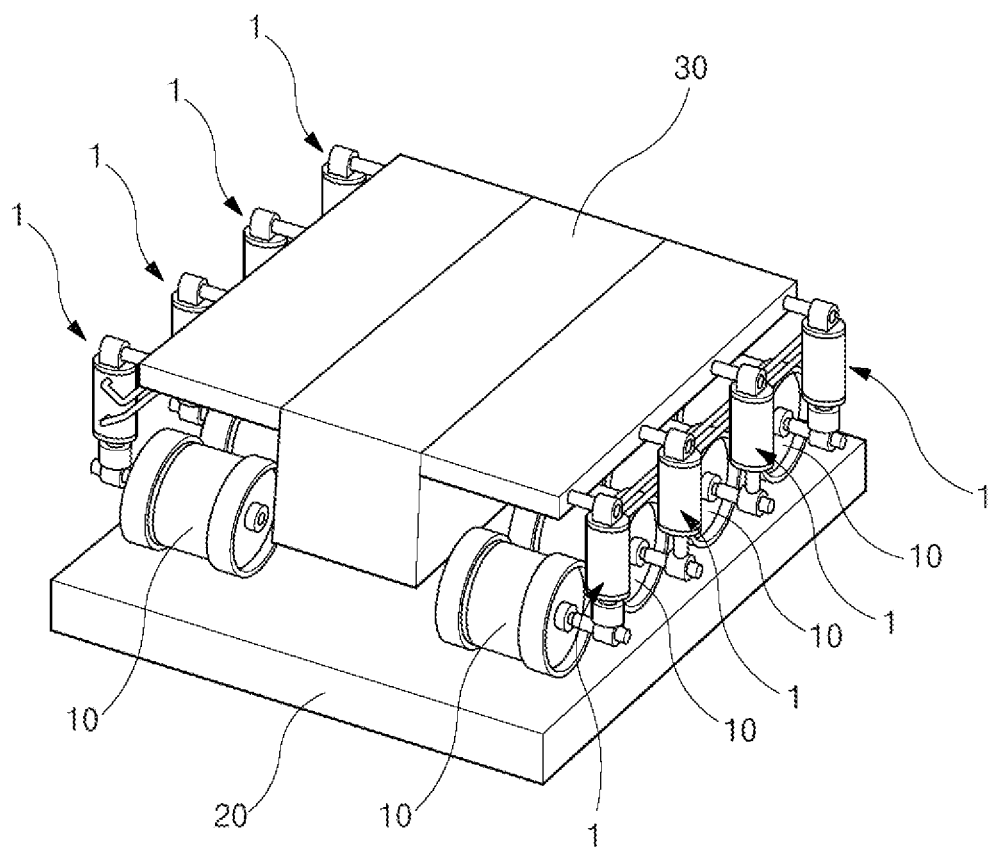
FIG. 7 is a state diagram of use of the apparatus according to this embodiment.

FIG. 7 is a state diagram of use of the apparatus according to this embodiment.

In this embodiment, as shown in FIG. 7, when a plurality of magnetic wheels 10 are provide in the left and right side of a frame 30 of the apparatus, individual adsorptive forces of the magnetic wheels 10 can be maximized by evenly distributing a load applied to the respective magnetic wheels 10.

This embodiment can be applied to a wide range of fields including welding, machining and so on, which are performed on ferromagnetic bodies, in addition to the ship cleaning apparatus.

In this embodiment, the magnetic wheels 10 may be in the form of a wheel including a permanent magnet or an electromagnet.

As described above, according to this embodiment, since a load applied to the respective magnetic wheels can be evenly distributed by the plurality of cylinder parts and the passage part interconnecting the plurality of cylinder parts, it is possible to provide the maximal utilization of individual adsorptive forces of the magnetic wheels.

While the present invention has been particularly shown and described with reference to exemplary embodiments thereof, it will be understood by those skilled in the art that various changes in form and details may be made therein without departing from the spirit and scope of the present invention. The exemplary embodiments are provided for the purpose of illustrating the invention, not in a limitative sense. Thus, it is intended that the present invention covers the modifications and variations of this invention provided they come within the scope of the appended claims and their equivalents.

What is claimed is:

1. A load distribution apparatus of a plurality of magnetic wheels, comprising:
    a plurality of cylinder parts each including one side respectively connected to one of the plurality of magnetic wheels and an upper space portion and a lower space portion whose interiors do not communicate to each other; and
    a passage part which serves as a moving path of fluid and interconnects the plurality of cylinder parts,
    wherein the passage part is configured to evenly distribute a load applied to the magnetic wheels by moving fluids in the upper space portion and the lower space portion of the respective cylinder part in such a manner that the fluids are not mixed,
    wherein the plurality of cylinder parts each further includes:
        a cylinder body partitioned into the upper space portion and the lower space portion by a piston elevatably provided in the cylinder body; and
        a piston rod including one side connected to the piston and the other side connected to the respective magnetic wheel, and
    wherein a stopper to limit a descent height of the cylinder body and to balance the apparatus is provided on the piston rod associated with a foremost magnetic wheel located along a frame of the apparatus, and a stopper to limit the descent height of the cylinder body and to balance the apparatus is provided on the piston rod associated with a rearmost magnetic wheel located along the frame of the apparatus.

2. The load distribution apparatus according to claim 1, wherein the cylinder bodies have the same inner diameter.

3. The load distribution apparatus according to claim 1, wherein the passage part includes:
    a first passage interconnecting the upper space portions of the cylinder parts to communicate to each other; and
    a second passage interconnecting the lower space portions of the cylinder parts to communicate to each other.

4. The load distribution apparatus according to claim 1, wherein the load distribution apparatus is used for cleaning of a bottom of a ship.

* * * * *